United States Patent [19]
Haider

[11] Patent Number: 6,056,693
[45] Date of Patent: May 2, 2000

[54] ULTRASOUND IMAGING WITH SYNTHETIC TRANSMIT FOCUSING

[75] Inventor: Bruno Hans Haider, Ballston Lake, N.Y.

[73] Assignee: General Electric Company, Schenectady, N.Y.

[21] Appl. No.: 09/375,229

[22] Filed: Aug. 16, 1999

[51] Int. Cl.$^7$ .................................................. A61B 8/00
[52] U.S. Cl. ........................................................ 600/443
[58] Field of Search ................................. 600/443, 444, 600/445, 447, 448, 449, 455

[56] References Cited

U.S. PATENT DOCUMENTS

| | | | |
|---|---|---|---|
| 4,604,697 | 8/1986 | Luthra et al. | 363/414 |
| 5,390,674 | 2/1995 | Robinson et al. | 128/660.07 |
| 5,431,167 | 7/1995 | Savord | 128/660.07 |
| 5,462,057 | 10/1995 | Hunt et al. | 128/661.01 |
| 5,469,849 | 11/1995 | Sasaki et al. | 600/443 |
| 5,551,433 | 9/1996 | Wright et al. | 600/443 |
| 5,568,813 | 10/1996 | Deitrich et al. | 128/661.01 |
| 5,623,928 | 4/1997 | Wright et al. | 128/661.01 |

OTHER PUBLICATIONS

Smith et al., "High–Speed Ultrasound Volumetric Imaging System–Part I: Transducer Design and Beam Steering," IEEE Trans. Ultrason. Ferroelect. & Frequ. Control, vol. 38, No. 2, Mar. (1991), pp. 100–107.

*Primary Examiner*—Marvin M. Lateef
*Assistant Examiner*—Maulin Patel
*Attorney, Agent, or Firm*—Marvin Snyder; Douglas E. Stoner

[57] ABSTRACT

Ultrasound imaging of biological tissue using synthetic transmit focusing is performed by forming a combined echo signal at a target range from two transmit events: one with the focal point located at a depth less than the target range depth and the other with the focal point located at a depth greater than the target range depth. In the target range segment lying between the two focal points, the two echo signals are combined by applying weighting factors that are determined as a function of the target range location along the range segment defined by the two transmit focal points. A first weighting factor applied to a first echo signal derived from a first transmit focused at a first focal point has a maximum (i.e., unity) at the first focal point and decreases with increasing distance from the first focal point (decreasing to zero at the second focal point). A second weighting factor applied to a second echo signal derived from a second transmit focused at a second focal point has a value equal to unity minus the first weighting factor.

18 Claims, 6 Drawing Sheets

ULTRASOUND IMAGING WITH SYNTHETIC TRANSMIT FOCUSING

FIELD OF THE INVENTION

This invention generally relates to ultrasound imaging of the human anatomy for the purpose of medical diagnosis and, more particularly, to methods and apparatus for improving the frame rate when each scan line in the ultrasound image is acquired using multiple transmit focal points.

BACKGROUND OF THE INVENTION

Medical ultrasound systems form images by sequentially acquiring the echo signals of adjacent ultrasound beams. An individual beam is formed by transmitting a focused pulse and receiving the echoes over a range of depths. During receive, the transducer delays are continuously updated such that the aperture is always focused to the depth from which the echo originated. This approach is commonly called dynamic receive focusing.

Transmit, being a single event, cannot be dynamically focused. The pulse, once launched, will only be focused at a single depth. This causes depths other than the focal point location to be out of focus to various degrees. Earlier imaging systems controlled this transmit focusing error by reducing the transmit aperture (i.e., increasing its F-number). The reduction in transmit aperture increased the depth of field to an acceptable level. This approach required a trade-off between the beamwidth at the focus and the depth of field. This single transmit focus approach is still the only successful imaging method when frame rate (or image update rate) is of highest importance. Cardiology and pediatric cardiology are the most obvious applications for this technique.

The trade-off between beamwidth and depth of field is undesirable because it limits spatial resolution. The approaches to overcome this deficiency can be grouped into multi-focus and synthetic aperture imaging. Most conventional medical ultrasound systems employ a form of multi-focus imaging. Here, the ultrasound beam is composed of several range segments. For every segment, the transmit and receive sequence is repeated. The transmit pulse is focused approximately in the middle of the segment's active range while reception is still dynamically focused. The echo signals originating from the active zone are retained for further processing while the other echoes are discarded. After all segments have been acquired and processed, the video detected echo signals are adjoined at so-called stitch lines.

The depth of field of a given transmit focal point needs to extend over only the length of the range segment. Therefore, the beamwidth to depth of field ratio trade-off can be shifted towards a narrower beam. Improved spatial resolution can be achieved by dividing the image into a larger number of segments.

Synthetic aperture imaging is a different approach, with two major benefits: a lower number of system processing channels and increased depth of field. U.S. Pat. No. 4,604,697 discloses an approach where the aperture is divided into a number of subapertures. Each subaperture independently acquires an image and those images, actually subimages, are added together to form the final image. The summation of subimages is done before any nonlinear processing, such as detection or compression. Since the summation is phase sensitive, an appropriate phase correction is applied to account for pixel location with respect to the various subaperture locations. Depth of field of the final image is determined by the depth of field of the subimage. Since each subaperture is only a fraction of the overall aperture, its depth of field is comparably large. With this method, a trade-off is made between the depth of field and the number of subapertures. Resolution improvement occurs in the phase-sensitive summation of subimages. Because the phase correction can be applied correctly for every pixel, a continuous transmit focus can be achieved.

An advantage of multi-focus imaging over synthetic aperture imaging is the independence of the various segment acquisitions. In synthetic imaging several phase sensitive subimages are added. Any target motion between the subimage acquisitions introduces phase errors, and thus, imaging artifacts. The phase errors are proportional to target motion and the acquisition time of all signals that contribute to a given pixel. Due to the inherent target motion in medical ultrasound, synthetic aperture imaging (in general) has not been successful. There is, however, an existing proof of synthetic imaging. A conventional ultrasound imaging system employs Golay-coded excitation wherein each scan line is formed by adding the echoes from two successive encoded transmissions. The signal summation is phase sensitive to cancel the range sidelobes of the individual transmissions. Phase errors due to target motion are acceptable because only two signals are added. Therefore, the acquisition time over which phase coherence is required remains comparably short. If synthetic aperture imaging were used to significantly increase the depth of field, a much larger number of subimage signals would be required.

A serious disadvantage of both multi-focus and synthetic aperture imaging is the increased time required to form an image frame. To a first approximation, this time is proportional to the number of range segments or subapertures. The frame rate is the inverse of the acquisition time. Due to the sequence of dependencies: acquisition time/number of segments/depth of field/beamwidth/spatial resolution, a trade-off must be made between frame rate and spatial resolution. For a system which favors spatial resolution, there is need to improve the frame rate.

Other approaches to improving frame rate are multi-line beamforming and RF (radio frequency) interpolation. The purpose of multi-line beamforming and RF interpolation is the recovery of the frame rate which is lost due to multiple transmit focal points. In multi-line beamforming, multiple (e.g., two) receive lines are acquired for one transmit pulse. To a first approximation, the frame rate increases by the factor of parallel receive lines. In practice, however, such improvement cannot be achieved because of acoustic artifacts associated with the multi-line acquisition. Due to those artifacts the line spacing must be decreased, which by itself reduces the frame rate. The most apparent artifact from multi-line acquisition is a lower spatial resolution due to the wider transmit pulse. A less focused transmit pulse is required to send acoustic energy into the multiple receive directions. Yet another artifact appears as an ultrasound line warping in the area of the transmit focal location. This is caused by narrowing of the transmit beam around its focus.

Radio frequency interpolation also increases the number of echo lines per transmit pulse. The ultrasound beams are acquired in the same way as in a conventional system (possibly including multi-focus). Then, however, additional RF lines are interpolated between the acquired lines from the beamformer. The interpolation is performed on the RF (or baseband I/Q) signals while the conventional scan interpolation operates on the detected signal. The RF interpolation includes phase information and therefore eliminates artifacts associated with video interpolation. Due to the artifact elimination, the physically acquired ultrasound lines (from the beamformer) can be spaced farther apart than in a conventional system and thus the frame rate can be increased.

The system implementation of multi-line acquisition is expensive since it requires parallel signal paths in the beamformer. Although the complexity increases almost linearly with the number of parallel receive lines, the amount of hardware increases less than that rate. Some of the parallel hardware can be efficiently implemented using custom designed chips, and thus some hardware savings can be attained. The implementation of RF interpolation is much less demanding since the beamformer is not affected. The RF interpolation uses beamsummed data of consecutive firings and interpolates one or more values for every sample.

One conventional ultrasonic imaging system achieves high spatial resolution by applying a low F-number in both transmit and receive. A drawback of the low transmit F-number is a short depth of field for a given transmit focal point, i.e., the high spatial resolution is achievable only over a small range in depth. To overcome this deficiency, the image is acquired in range segments where each segment has its dedicated focal point. By applying a large number of focal points, spatial resolution is improved. While this provides good image quality, it compromises on the imaging frame rate, i.e., the image acquisition time is drastically increased by the sequential processing of a large number of focal points. In a conventional ultrasound system, each range segment is acquired with its associated transmit focal point. The segments are processed individually and joined to form the image. An image point is formed from data from a single segment. (There might be a short transition to blend from one segment to the other; however, no attempt is made to combine data from more than one focal point with the goal of correcting for focusing errors.) For every additional image segment, a separate transmit event is required, thereby increasing the acquisition time for the entire image. As a first approximation, the acquisition time is proportional to the number of segments, i.e., the number of transmit focal points. There is need for a method which will allow the number of transmit focal points to be reduced without loss of spatial resolution.

SUMMARY OF THE INVENTION

The present invention improves the frame rate when the ultrasound image is acquired with multiple transmit focal points. The number of transmit focal points per scan line is reduced without losing spatial resolution. With the reduced number of transit focal points, the frame rate is increased.

In accordance with a preferred embodiment of the invention, a combined echo signal is formed at a target range from two transmit events: one with the focal point located at a depth less than the target range depth and the other with the focal point located at a depth greater than the target range depth. Respective echo signals are acquired for the two transmits. In the target range segment lying between the two focal points, the two echo signals are combined by applying weighting factors determined as a function of location of the target range along the range segment defined by the two transmit focal points. A first weighting factor applied to a first echo signal derived from a first transmit focused at a first focal point has a maximum (i.e., unity) at the first focal point and decreases with increasing distance from that first focal point (decreasing to zero at the second focal point). A second weighting factor applied to a second echo signal derived from a second transmit focused at a second focal point has a value equal to unity minus the first weighting factor.

Both focal points cause a phase error when the evaluation range is between those focal points, but the phase errors are of opposite direction and can cancel each other to some degree. The way in which the data from the two transmit focal points are combined is crucial for the phase error cancellation. In accordance with one preferred embodiment of the invention, weighted arithmetic averages are used to combine the echo signals from two transmits. In accordance with another preferred embodiment, weighted geometric averages are used. However, it is expected that other (homomorphic) operations can be employed to achieve at least comparable results.

The foregoing description of operation is primarily intended for medical ultrasonic imaging. However, the concept is not specific to medical ultrasound, being applicable to any coherent imaging method which operates in the near-field of the antenna and applies more than one transmit focal point.

DETAILED DESCRIPTION OF THE PREFERRED EMBODIMENTS

Figure 1:
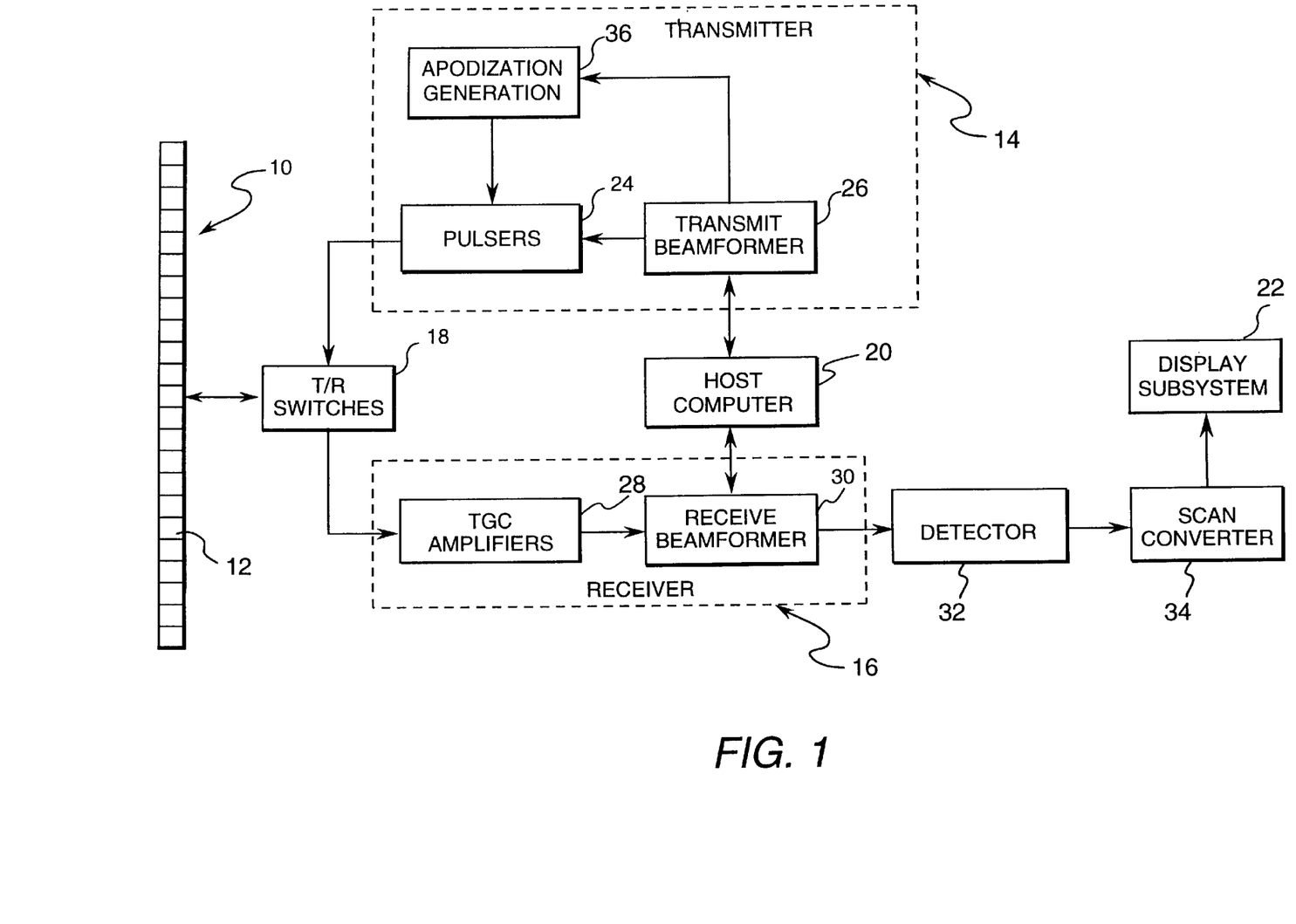
FIG. 1 is a block diagram of a conventional ultrasound imaging system.

The invention can be incorporated in an ultrasonic imaging system of the type generally outlined in FIG. 1. This imaging system comprises a transducer array 10 having a plurality of separately driven piezoelectric transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. Transmitter 14 and receiver 16 are operated under control of a host computer (master controller) 20 responsive to commands from a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a display subsystem 22 which typically comprises a video processor and a display monitor (not shown).

Under the direction of host computer 20, transmitter 14 drives transducer array 10 such that the ultrasonic energy is transmitted as a directed focused beam. To accomplish this, respective time delays are imparted to a multiplicity of pulsers 24 by a transmit beamformer 26. Host computer 20 determines the conditions under which the acoustic pulses will be transmitted. With this information, transmit beamformer 26 determines the timing and amplitudes of each of the transmit pulses to be generated by pulsers 24. The amplitude of each transmit pulse is generated by an apodization generation circuit 36, which may be a high-voltage controller that sets the power supply voltage to each pulser. Pulsers 24, in turn, send the transmit pulses to each of elements 12 of transducer array 10 via T/R switches 18, which protect time-gain compensation (TGC) amplifiers 28 from the high voltages which may exist at the transducer array. The apodization weighting for a particular transmit channel is a function of distance between the transmit focal position and the transducer element associated with that transmit channel. Weightings are generated by apodization generation circuit 36, which may comprise a set of digital-to-analog converters that apply the weighting data from transmit beamformer 26 to pulsers 24. By appropriately adjusting the transmit focus time delays in a conventional manner and also adjusting the transmit apodization weightings, a multiplicity of ultrasonic waves transmitted by individual transducer elements can be combined to form a directed and focused transmit beam. The apodization weightings and the transmit focus time delays may be set by the host computer based on system programming and operator inputs.

Each burst of ultrasonic energy is reflected from objects located at successive ranges along each transmit beam. The resulting echoes are transduced into analog electrical echo signals by each transducer element 12 and a sample of the echo signal magnitude at a particular point in time represents the amount of reflection occurring at a specific range. Due to the differences in the propagation paths between a reflecting point and each transducer element 12, the echoes are not detected simultaneously and their amplitudes are not equal. Receiver 16 amplifies the separate echo signals via a respective TGC amplifier 28 in each receive channel. TGC is carried out by increasing or decreasing gain as a function of depth. The amount of amplification provided by the TGC amplifiers is controlled from a TGC circuit (not shown), that is set by the host computer and hand operation of potentiometers. The analog echo signals are then sent to receive beamformer 30.

Under the direction of host computer 20, receive beamformer 30 tracks the direction of the transmitted beam. Receive beamformer 30 converts the analog signals to digital signals, imparts the proper time delays and receive apodization weightings to each amplified echo signal, and sums the digital signals thus modified to provide an echo signal that accurately indicates the total ultrasonic energy reflected from a point located at a particular range along one ultrasonic beam. The receive channels also include circuitry for filtering the received pulses. The apodization weightings and focus time delays on receive may be set by the host computer based on system programming and operator inputs.

In one conventional system, the time-delayed receive signals are summed and supplied to a signal processor or detector 32 which converts the summed receive signals to display data. In the typical gray-scale display image, the display data are the envelope of the signal with some additional processing, such as edge enhancement and logarithmic compression. For radiofrequency (RF) data, the envelope can be detected using a low-pass filter; for baseband data, the envelope can be detected using an envelope detector which produces a signal representing $(I^2+Q^2)^{1/2}$, where I is the in-phase signal component and Q is the quadrature signal component of the baseband data.

In general, the display data are converted by a scan converter 34 into X-Y format for video display. The scan-converted frames are passed to a video processor (not shown) incorporated in display subsystem 22. The video processor maps the video data for display and sends the mapped image frames to the display subsystem.

The images displayed by the video monitor (not shown) of display subsystem 22 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor is continuously refreshed by reading the value of its corresponding element in the data array in a well-known manner. In the conventional system, each pixel has an intensity value which is a function of the backscatter cross section of a respective sample volume in response to interrogating focused ultrasound wave energy.

Figure 2:
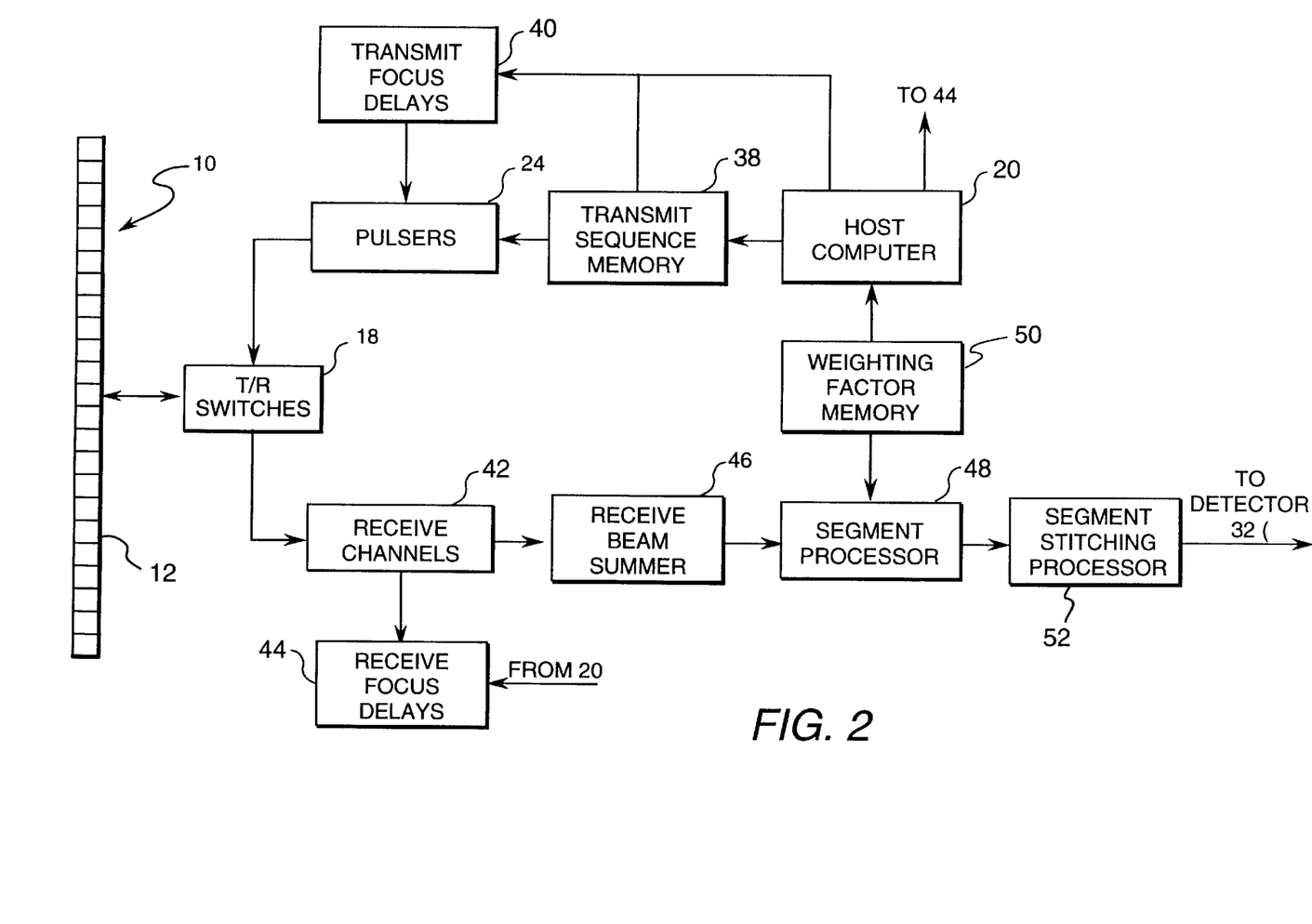
FIG. 2 is a block diagram of portions of an ultrasound imaging system in accordance with preferred embodiments of the invention.

FIG. 2 shows portions of an ultrasound imaging system in accordance with one preferred embodiment of the invention. In this system each transducer element in the transmit aperture is pulsed by a respective pulser 24 in accordance with a transmit sequence (for bipolar pulsers, a sequence +1's and −1's) stored in a transmit sequence memory 38. In response to the transmit sequence, each pulser supplies a waveform to the associated transducer element. The transmit sequence can be optimized to ensure that the most energy passes through the transducer passband. The appropriate transmit sequence can be selected depending on the operating characteristics of the transducer and the desired point spread function.

In multi-focus transmit imaging, pulsers 24 drive elements 12 of transducer array 10 such that the ultrasound wave energy produced during successive transmit firings is focused at a series of transmit focal positions along each of a multiplicity of transmit beam directions. To accomplish this, a respective set of transmit focus time delays 40 are imparted to the respective pulsed waveforms produced by the pulsers for each transmit focal point. By appropriately adjusting the transmit focus time delays in a conventional manner, the ultrasound beams can be focused at a multiplicity of transmit focal positions to effect a scan in an image plane.

Following each transmit, the returned ultrasound wave energy is transduced by transducer elements 12 into electrical echo signals, which are fed to respective receive channels 42 of the receive beamformer. Under the direction of the host computer, the receive beamformer tracks the direction of the transmitted beam. The receive beamformer imparts the proper receive focus time delays 44 to the received echo signal and sums the delayed echo signals to provide a composite echo signal that accurately represents the total ultrasonic energy reflected from a particular range point along a scan line. The time-delayed echo signals are summed in a receive beamsummer 46 for each transmit firing.

In accordance with a preferred embodiment of the invention, the summed receive signal for each transmit firing is supplied to a segment processor 48 which combines two beamsummed echo signals, corresponding to a pair of adjacent transmit focal points in the range segment lying between those transmit focal points to produce a combined receive signal. The segment processor applies weighting factors to the two beamsummed echo signals to form the combined receive signal. The weighting factors are supplied by a weighting factor memory 50, which is in turn programmed by host computer 20. A respective combined receive signal is produced for each range segment along a scan line. A segment stitching processor 52 then stitches the combined receive signals for that scan line together to form a receive vector. The receive vector is produced for further processing, e.g. (see FIG. 1), envelope detection in detector 32, scan conversion in scan converter 34 and video processing in display subsystem 22.

Figure 3:
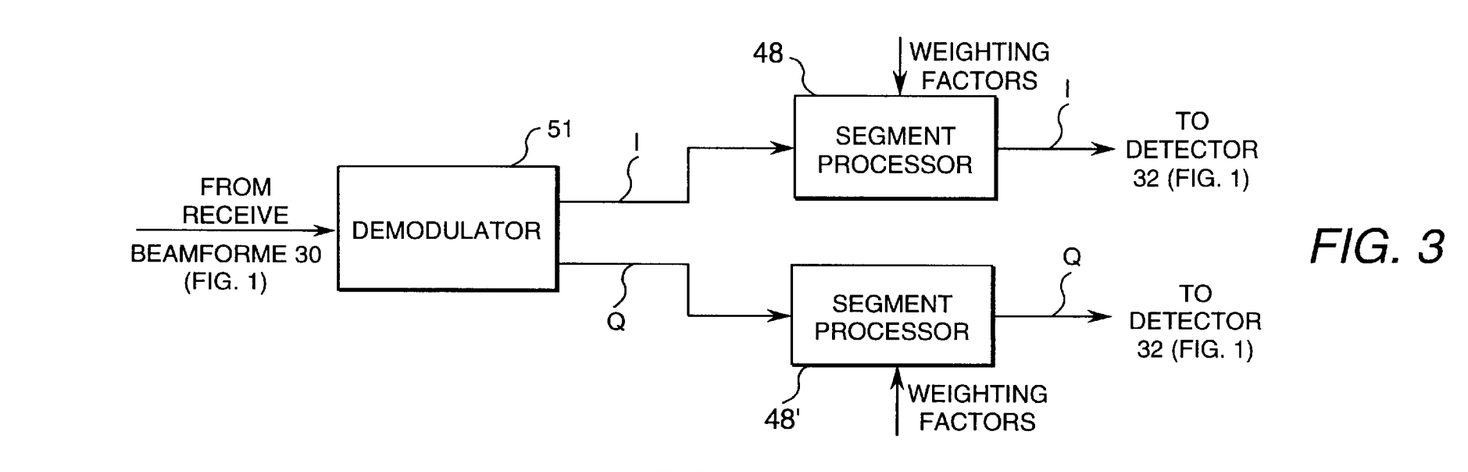
FIG. 3 is a block diagram of portions of an ultrasound imaging system in accordance with another preferred embodiment of the invention.

The range segment processing technique disclosed herein can be applied to radiofrequency signals or to baseband signals. For radiofrequency signals, the radiofrequency signals produced by the receive beamformer are demodulated into in-phase and quadrature (I/Q) signal components by a demodulator 51, shown in FIG. 3. The I/Q signal components are then separately processed by respective segment processors 48 and 48'. The segment-processed I/Q signal components are supplied to detector 32 (FIG. 1) for forming the envelope by computing the quantity $(I^2+Q^2)^{1/2}$. The envelope of the signal undergoes some additional processing, such as logarithmic compression and edge enhancement, to form display data which are supplied to the scan converter.

Figure 4:
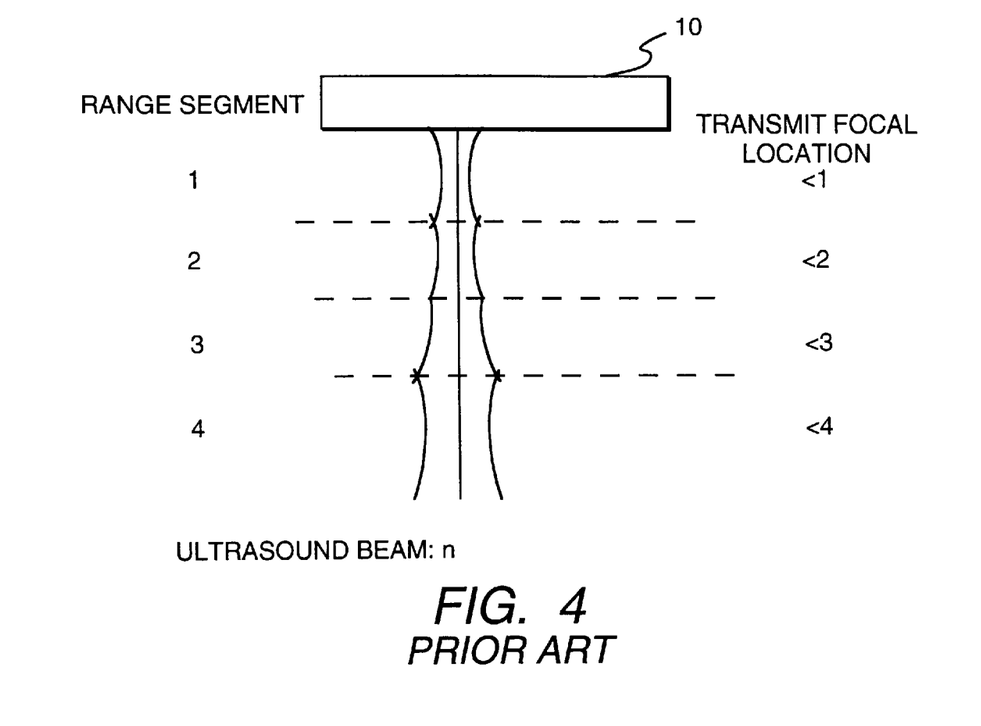
FIG. 4 is a schematic depiction of a transmit beam pattern with multiple focal points in accordance with a conventional transmit sequence.

In accordance with the preferred embodiments of the invention, the multiple transmit focal points along a scan line span a range adequate to cover the region of interest. The spacing of focal points within this range is determined by the worst case focus degradation for targets not coinciding with any of the focal points. FIG. 4 shows the beamshape of a conventional system after the range segments are stitched together. The beamwidth is optimal only at the focal locations and is worst at the stitch points (dotted lines). By using more focal points, the distance between stitch points is reduced and the worst case focus degradation is diminished.

The invention presented here allows an increase in distance between focal points without degrading the beamwidth at points situated between the focal points. The preferred embodiment will be described using an example wherein the number of number of focal points along each scan line is two. However, it should be appreciated that the invention encompasses any number of transmit focal points greater than unity. For the example, during a first transmit firing an ultrasound beam is transmitted with a first focal point at a first depth along a transmit beam direction. A first echo signal is received following the first transmit firing. During a second transmit firing an ultrasound beam is transmitted with a second focal point at a second depth (greater than the first depth) along the transmit beam direction. A second echo signal is received following the second transmit firing. The respective portions of the first and second echo signals corresponding to ultrasound wave energy reflected from points along the range segment lying between the first and second focal points are then combined in accordance with a weighting function. In accordance with the preferred embodiments, the weighting function is selected so that a combined receive signal is acquired. The signal combination applies weighting factors that are determined by the distances of the target range to the respective transmit focal points. In accordance with the preferred embodiments, the weighting factor applied to a first echo signal derived from a first transmit focused at a first focal point has a maximum at the first focal point and decreases with increasing distance from that first focal point (decreasing to zero at the second focal point); similarly, the weighting factor applied to a second echo signal derived from a second transmit focused at a second focal point has a maximum at the second focal point and decreases with increasing distance from that second focal point (decreasing to zero at the first focal point). The sum of the weighting factors applied to the echo signals acquired at any target range lying between the first and second focal points is equal to unity. When the display depth exactly coincides with a focal point, then only the echo signal from that focal point contributes to the combined signal. The preferred embodiments of the weighting function are weighted arithmetic and geometric averages.

Figure 5:
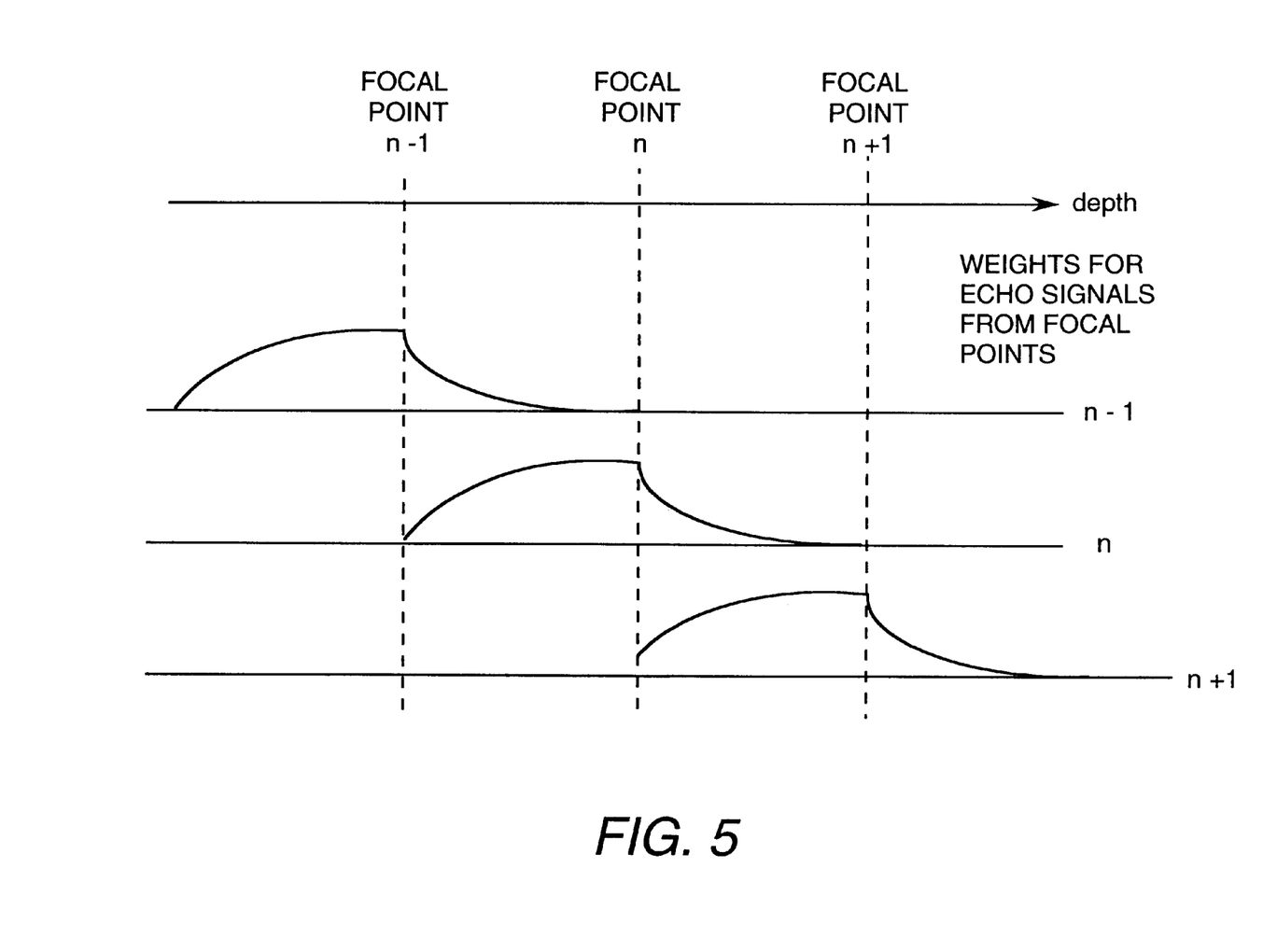
FIG. 5 is a graph of a weighting function for combining the echo signals from two transmit firings having different focal points in accordance with a preferred embodiment of the invention.

FIG. 5 depicts the weighting function for the echo signals returned after transmits to three focal points (n−1), n and (n+1) at three different depths. As can be seen in FIG. 5, the weighting factors change as a function of depth (range). Further, the sum of the weighting factors at any depth is equal to unity. Alternatively, the shape of the weighting function can be linear. The weighting function must be selected to minimize focus degradation.

The signal combination, which operates with RF or baseband data, is a phase-sensitive process and should be done before any nonlinear signal processing. The method of the preferred embodiment is only an approximate phase error correction. Due to the nature of the residual phase errors, the signal combination can be either additive or multiplicative. It appears that the multiplicative approach provides better control of the beamwidth.

For an additive combination, the combined signal at a particular range r is a weighted arithmetic average of the form $$S_{arith}(r)=R_n(r)A(t)+R_{n+1}(r)(1-A(t)) \tag{1}$$

where $R_n(r)$ and $R_{n+1}(r)$ are the data samples at range r of the echo signals received from transmits focused at focal points n and (n+1) located at ranges $r_n$ and $r_{n+1}$, respectively, wherein $r_n \leq r \leq r_{n+1}$; and A(t) is the weighting factor as a function of time (i.e., range). The echo signals and the weighting factors are functions of time.

Figure 6:
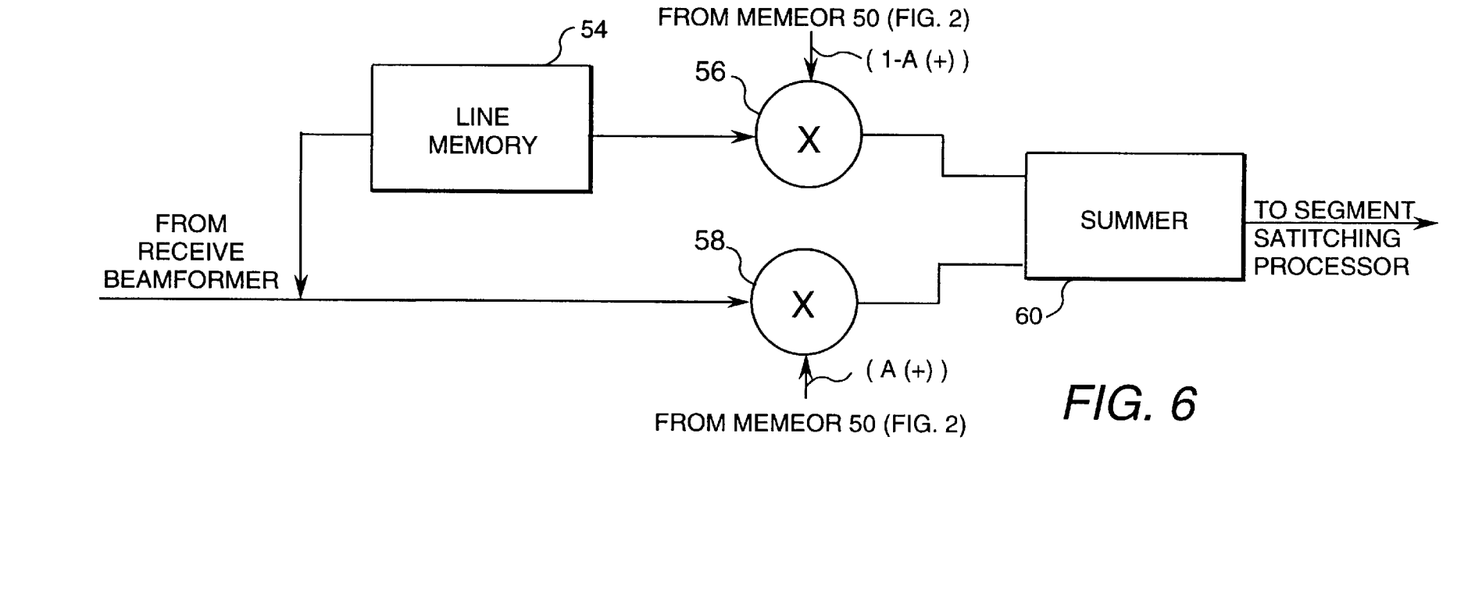
FIG. 6 is a block diagram of a segment processor in accordance with a preferred embodiment of the invention.

An implementation of a segment processor in accordance with Eq. (1) is shown in FIG. 6. The segment processor comprises a line memory 54 for storing a first echo signal while a second echo signal is being acquired. The first echo signal is supplied from line memory 54 to a first input of a first multiplier 56. The second input of multiplier 56 receives a weighting factor (1−A(t)) from the weighting factor memory (50 in FIG. 2). The second echo signal is received by a first input of a second multiplier 58, while the second input of multiplier 58 receives a weighting factor A(t) from the weighting factor memory. The output of the first echo signal by line memory 54 is timed so that receipt of the first and second echo signals by the respective multipliers is synchronized, i.e., the line memory provides a predetermined delay which is substantially equal to the pulse repetition interval. The output signals of multipliers 56 and 58 are summed in a summer 60 to form the signal processor output signal.

For a multiplicative combination, the combined signal at a particular range r is a weighted geometric average of the form $$S_{mult}(r) = R_n(r)^{A(t)} * R_{n+1}(r)^{(1-A(t))} \quad (2)$$

Figure 7:
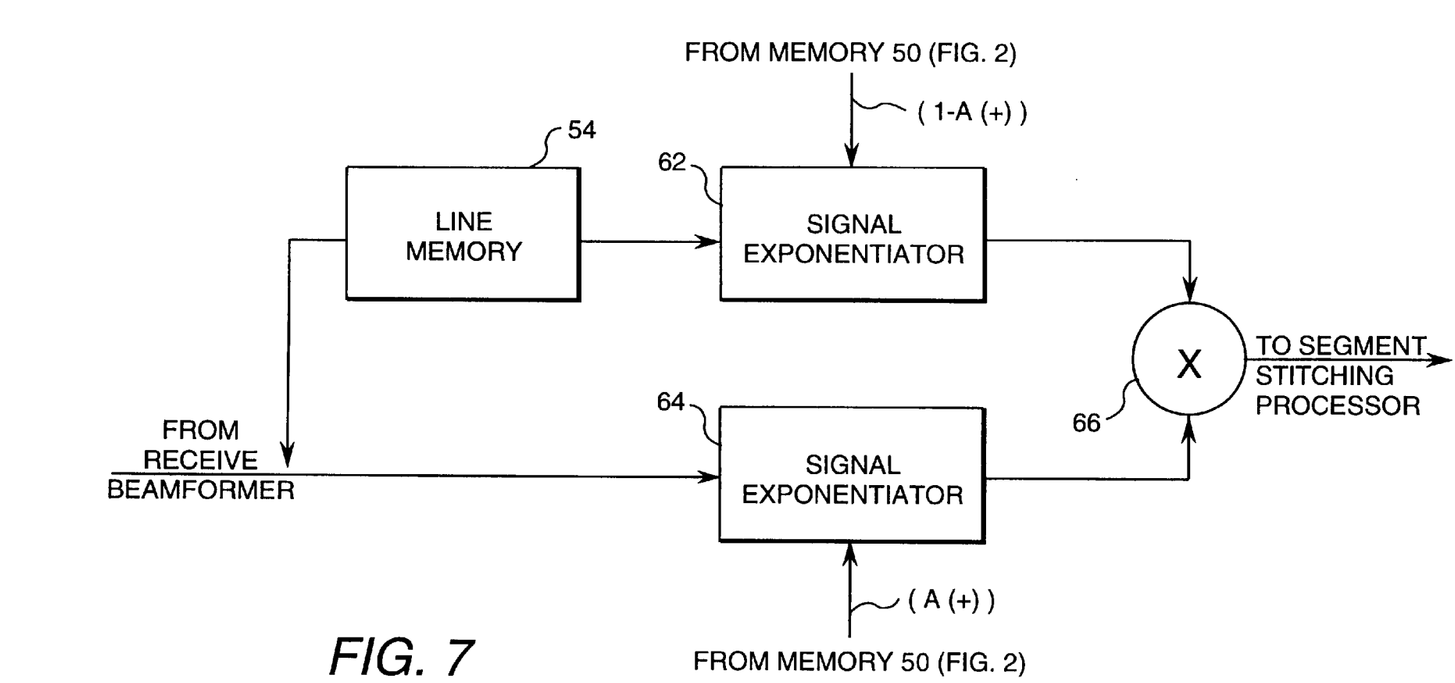
FIG. 7 is a block diagram of a segment processor in accordance with another preferred embodiment of the invention.

An implementation of a segment processor in accordance with Eq. (2) is shown in FIG. 7. Again the segment processor comprises a line memory 54 for storing a first echo signal while a second echo signal is being acquired. The first echo signal is supplied from line memory 54 to a first input of a first signal exponentiator 62. The second input of the signal exponentiator 62 receives a weighting factor (1−A(t)) from weighting factor memory 50 (FIG. 2). The second echo signal is received by a first input of a second signal exponentiator 64, while the second input of signal exponentiator 64 receives a weighting factor A(t) from weighting factor memory 50 (FIG. 2). Each signal exponentiator raises the first input to a power equal to the second input. The output signals of signal exponentiators 62 and 64 are supplied to a multiplier 66, the resulting product forming the segment processor output signal.

Figure 8:
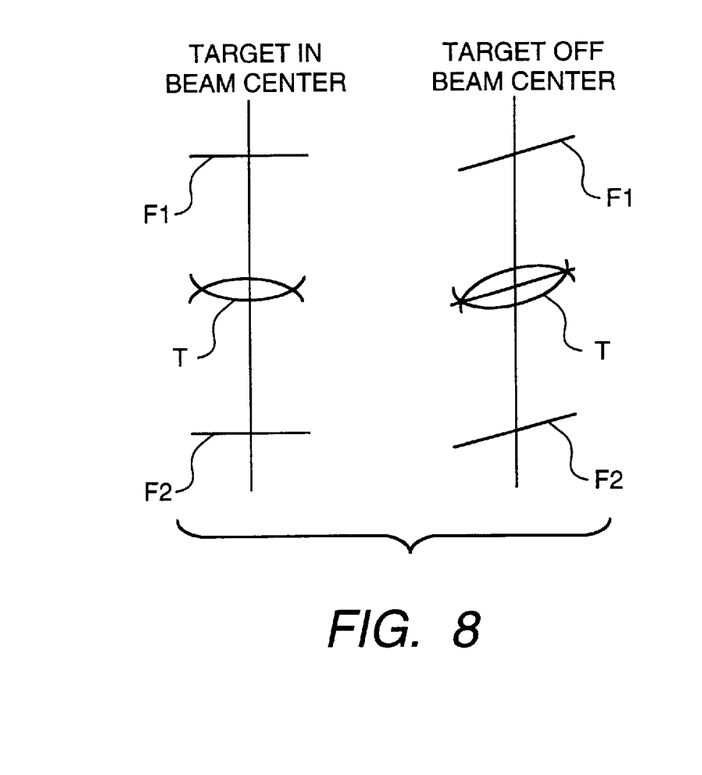
FIG. 8 is a schematic depiction of the phase errors across transmitting elements at and between transmit focal points when the target is in beam center (left side) and when the target is off center (right side).

The focus improvement realized by the method disclosed above can be envisioned in the following way. FIG. 8 shows the phase errors across transmitting elements. If the target is at a focal point and in the beam center, then the phase error is zero. The zero phase error is indicated by the horizontal lines representing focal points F1 and F2 on the left side of FIG. 8. If the target is off center but still at the focal point, then the phase error is non-zero but linear (shown on the right side by the inclined straight lines representing focal points F1 and F2). This type of phase error is desirable since it creates the beam sidelobe pattern of a focused aperture. If a target T is in between focal points, the phase error has a curvature which is convex or concave depending on whether the first or second focal point is applied. If the target is in the beam center (see the left side of FIG. 8), then the curvature is symmetric. An additional slope is overlaid when the target is off center, as seen on the right side of FIG. 8. When the two focal points are combined, the concave and convex phase errors can compensate each other. The resulting phase error is (to a first approximation) linear and resembles the phase of a focused aperture.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An imaging system comprising:
   a transducer array including a multiplicity of transducer elements for transmitting wave energy in response to electrical activation and transducing returned wave energy into electrical signals;
   a transmitter coupled to said transducer array and programmed to activate a plurality of said transducer elements to transmit wave energy focused at first and second focal points during first and second transmit events respectively;
   a receiver programmed to respectively form first and second receive signals from electrical signals supplied from said plurality of transducer elements subsequent to said first and second transmit events respectively;
   a segment processor for applying a weighting function to portions of said first and second receive signals returned from range points along a range segment lying between said first and second focal points to form first and second weighted receive signals, and then for combining said first and second weighted receive signals to form a combined receive signal; and
   a subsystem for displaying an image having an image portion which is a function of at least said combined receive signal.

2. The system as recited in claim 1, wherein said segment processor is adapted to apply a first weighting factor to a first datum of said first receive signal corresponding to wave energy returned from a target range along said range segment and adapted to apply a second weighting factor to a first datum of said second receive signal corresponding to wave energy returned from said target range, wherein the sum of said first and second weighting factors is unity.

3. The system as recited in claim 2, wherein said segment processor is adapted to apply a third weighting factor to a second datum of said first receive signal corresponding to wave energy returned from said first focal point and adapted to apply a fourth weighting factor to a second datum of said second receive signal corresponding to wave energy returned from said second focal point, wherein said third weighting factor is unity and said fourth weighting factor is zero.

4. The system as recited in claim 1, wherein said combined receive signal comprises one of the group consisting of the sum of said first and second weighted receive signals, the product of said first and second weighted receive signals, a weighted arithmetic average of said first and second receive signals, and a weighted geometric average of said first and second receive signals.

5. The system as recited in claim 1, wherein said subsystem comprises:
   a processing subsystem for forming an image signal from said combined receive signal; and
   a display subsystem programmed so that said image portion is a function of said image signal.

6. The system as recited in claim 1, further comprising a segment stitching processor for stitching together first and second combined receive signals acquired respectively from first and second range segments.

7. The system as recited in claim 1, wherein said transducer elements comprise piezoelectric elements for transmitting ultrasound waves in response to electrical activation and for transducing returned waves into electrical signals.

8. An imaging system comprising:
   a transducer array including a multiplicity of transducer elements for transmitting wave energy centered in response to electrical activation and transducing returned wave energy into analog electrical signals;
   a multiplicity of analog-to-digital converters for converting said analog electrical signals into digital electrical signals;
   a display monitor for displaying an image having an image portion which is a function of an image signal; and
   a computer programmed to perform the following steps of:
   (a) activating transducer elements of said array to transmit wave energy focused at first and second focal points during first and second transmit events respectively;
   (b) forming first and second receive signals from electrical signals produced by said transducer elements subsequent to said first and second transmit events, respectively;

(c) applying a weighting function to portions of said first and second receive signals returned from range points along a range segment lying between said first and second focal points to form first and second weighted receive signals;

(d) combining said first and second weighted receive signals to form a combined receive signal;

(e) forming an image signal derived at least in part from said combined receive signal; and (f) sending said image signal to said display monitor.

9. The system as recited in claim 8, wherein said computer is further programmed to apply a first weighting factor to a first datum of said first receive signal corresponding to wave energy returned from a target range along said range segment and to apply a second weighting factor to a first datum of said second receive signal corresponding to wave energy returned from said target range, wherein the sum of said first and second weighting factors is unity.

10. The system as recited in claim 9, wherein said computer is further programmed to apply a third weighting factor to a second datum of said first receive signal corresponding to wave energy returned from said first focal point and to apply a fourth weighting factor to a second datum of said second receive signal corresponding to wave energy returned from said second focal point, wherein said third weighting factor is unity and said fourth weighting factor is zero.

11. The system as recited in claim 8, wherein said combined receive signal comprises one of the group consisting of the sum of said first and second weighted receive signals, the product of said first and second weighted receive signals, a weighted arithmetic average of said first and second receive signals, and a weighted geometric average of said first and second receive signals.

12. The system as recited in claim 8, wherein said computer is further programmed to stitch together first and second combined receive signals acquired respectively from first and second range segments.

13. The system as recited in claim 8, wherein said transducer elements comprise piezoelectric elements for transmitting ultrasound waves in response to electrical activation and for transducing returned ultrasound waves into electrical signals.

14. A method of operating an imaging system, said system comprising a multiplicity of transducer elements for transmitting wave energy in response to electrical activation and for transducing returned wave energy into electrical signals, and a display monitor for displaying an image having an image portion which is a function of an image signal, said method comprising the steps of:

(a) activating transducer elements of said array to transmit wave energy focused at first and second focal points during first and second transmit events, respectively;

(b) forming first and second receive signals from electrical signals produced by said transducer elements subsequent to said first and second transmit events respectively;

(c) applying a weighting function to portions of said first and second receive signals returned from range points along a range segment lying between said first and second focal points to form first and second weighted receive signals;

(d) combining said first and second weighted receive signals to form a combined receive signal;

(e) forming an image signal derived at least in part from said combined receive signal; and (f) sending said image signal to said display monitor.

15. The method as recited in claim 14, wherein the step of applying a weighting function comprises the steps of applying a first weighting factor to a first datum of said first receive signal corresponding to wave energy returned from a target range along said range segment and applying a second weighting factor to a first datum of said second receive signal corresponding to wave energy returned from said target range, wherein the sum of said first and second weighting factors is unity.

16. The method as recited in claim 15, wherein the combining step comprises the steps of applying a third weighting factor to a second datum of said first receive signal corresponding to wave energy returned from said first focal point and applying a fourth weighting factor to a second datum of said second receive signal corresponding to wave energy returned from said second focal point, wherein said third weighting factor is unity and said fourth weighting factor is zero.

17. The method as recited in claim 14, wherein said combined receive signal is a weighted arithmetic average of said first and second receive signals.

18. The method as recited in claim 14, wherein said combined receive signal is a weighted geometric average of said first and second receive signals.

* * * * *